(12) United States Patent
Certain

(10) Patent No.: US 8,162,264 B2
(45) Date of Patent: Apr. 24, 2012

(54) METHOD OF JETTISONING AN EXTERNAL LOAD CARRIED BY AN AIRCRAFT, AND AN ASSOCIATED DEVICE

(75) Inventor: Bernard Certain, Aix en Provence (FR)

(73) Assignee: Eurocopter, Marignane Cedex (FR)

( * ) Notice: Subject to any disclaimer, the term of this patent is extended or adjusted under 35 U.S.C. 154(b) by 411 days.

(21) Appl. No.: 12/565,827

(22) Filed: Sep. 24, 2009

(65) Prior Publication Data
US 2010/0140412 A1 Jun. 10, 2010

(30) Foreign Application Priority Data
Sep. 26, 2008 (FR) ...................................... 08 05298

(51) Int. Cl.
*B64D 1/00* (2006.01)
(52) U.S. Cl. ..................................... 244/137.4; 212/275
(58) Field of Classification Search ............... 244/17.13, 244/118.1, 137.4; 212/275, 308, 900; 254/415
See application file for complete search history.

(56) References Cited

U.S. PATENT DOCUMENTS

| 3,756,543 | A |   | 9/1973  | Fowler et al.        |
|-----------|---|---|---------|----------------------|
| 3,904,156 | A |   | 9/1975  | Smith                |
| 3,982,733 | A | * | 9/1976  | Orme ............. 254/415 |
| 4,741,501 | A | * | 5/1988  | Clelford et al. ........... 244/17.13 |
| 5,499,785 | A | * | 3/1996  | Roberts et al. ............ 244/137.4 |
| 5,788,186 | A | * | 8/1998  | White ........... 244/137.4 |
| 6,533,220 | B2 | * | 3/2003  | Schuster ............ 244/118.1 |
| 6,668,668 | B1 | * | 12/2003 | Peshkin ............ 73/862.56 |
| 2007/0200032 | A1 |   | 8/2007  | Eadie et al. |

FOREIGN PATENT DOCUMENTS

| EP | 0 259 250 | 3/1988 |
| FR | 2.149.777 | 3/1973 |
| FR | 2.197.766 | 3/1974 |
| FR | 2 502 772 | 10/1982 |
| FR | 2 575 550 | 7/1986 |
| GB | 1074465 | 6/1965 |
| GB | 1 424 054 | 2/1976 |
| GB | 2 169 572 | 7/1986 |
| GB | 2 437 407 | 10/2007 |
| JP | 9-286397 | 11/1997 |

OTHER PUBLICATIONS

French Search Report dated May 26, 2009, from corresponding French application.

* cited by examiner

*Primary Examiner* — Galen Barefoot
(74) *Attorney, Agent, or Firm* — Brooks Kushman P.C.

(57) ABSTRACT

The present invention relates to a method and an associated device for automatically jettisoning an external load (4) that is reversibly suspended from a release-hook (12) of an aircraft fuselage (2) by a sling (13), which method comprises:
 measuring the angle (θ) between said sling (13) and a vertical axis in elevation of the aircraft; and
 activating automatic jettisoning when firstly said angle (θ) exceeds an upper limit (LSUP), and secondly said sling (13) is directed towards the rear (4') of the aircraft, thereby making it possible, optionally, to proceed with jettisoning said external load (4).

16 Claims, 2 Drawing Sheets

METHOD OF JETTISONING AN EXTERNAL LOAD CARRIED BY AN AIRCRAFT, AND AN ASSOCIATED DEVICE

The present invention relates to a method of jettisoning an external load carried by an aircraft, such as the helicopter, and it also relates to an associated device.

FIELD OF THE INVENTION

The technical field of the invention is thus that of a device and a method for jettisoning an external load from an aircraft.

An aircraft, and more particularly a rotorcraft of the helicopter type, may optionally be fitted with an installation for transporting external loads.

Thus, the rotorcraft generally includes a swiveling release-hook fastened to a carrier structure of the rotorcraft. A sling is then attached to the release-hook so as to enable heavy external loads to be carried. Furthermore, the release-hook allows the external load to be jettisoned while in flight, thereby enabling said external load to be released in a determined position, or when there is an emergency situation.

BACKGROUND OF THE INVENTION

The following documents present the technological background of installations for transporting loads.

More precisely, Document GB 2 437 407 discloses the existence of a system provided with a hook for suspending a load, and means for detaching the load.

Document EP 0 259 250 shows a helicopter having suspended therefrom a container that is provided with stabilizers.

Document FR 2 149 777 presents a system for stabilizing an external load beneath an aircraft, making provision to act on the flying controls in order to enable the aircraft to perform correcting movements.

Document FR 2 575 550 presents a system that acts in real-time to deliver the weight supported by the release-hooks that have an external load stowed thereto.

Document JP19960101019 describes a winch suitable for limiting the accelerations imparted to a body suspended from the winch by a sling.

Document GB 1 074 465 presents a device for limiting the swing angle of a sling fastened to a winch and relative to the gravity axis.

The same applies to Document U.S. Pat. No. 3,904,156, which makes provision for actuators to act on a rigid sling.

Finally, Document FR 2 197 766 provides for explosive means to release the hook that supports the load and to cut through the sling.

It can be seen from the prior art that implementing a sling secured to the structure of a rotorcraft is not without danger.

Firstly, untimely releases of the supported load can be observed, which releases may give rise to consequences that are unfortunate firstly for any elements lying on the trajectory followed by said external load, and secondly for the rotorcraft itself, in so far as the release might possibly and unfortunately lead to the sling whipping back suddenly towards the rotorcraft.

A release-hook is generally controlled either electrically, or else mechanically by means of a mechanical transmission system. A fault in such a mechanical transmission system thus sometimes leads to untimely jettisoning.

Secondly, in the event of the external load or the sling catching onto an obstacle on the ground, the helicopter becomes blocked. Because of the inertia of the rotorcraft, high forces are exerted on the sling. These forces lead to the sling braking, thereby releasing the rotorcraft.

Nevertheless, given the very sudden nature of such a maneuver, the angle of incidence of the disk constituted by the rotor blades rocks rearwards during a transient stage. The blades and then run the risk of striking into, or even of cutting through, the tail boom of the rotorcraft.

Finally, thirdly, after untimely un-hooking or after the sling has broken, the portion of the sling that remains connected to the rotorcraft tends to whip rapidly upwards and thus runs the risk of tangling with the rotor of the rotorcraft.

OBJECT AND BRIEF SUMMARY OF THE INVENTION

The present invention thus proposes a method of automating the jettisoning of an external load in the event of an incident.

According to the invention, a method of automatically jettisoning an external load reversibly suspended from a release-hook of an aircraft fuselage by a sling, is remarkable in particular in that it comprises:

measuring the angle between said sling and a vertical axis in elevation of the aircraft parallel to the yaw axis of the aircraft and passing via the connection point connecting support means for the release-hook to the fuselage of the aircraft; and activating automatic jettisoning when firstly said angle exceeds an upper bound, and when secondly said sling is directed towards the rear of the aircraft thereby making it possible, optionally, to proceed with jettisoning said external load.

It should also be observed that, in addition to the yaw axis, the aircraft has a longitudinal axis referred to as the "roll axis", and a transverse axis referred to as the "pitch axis".

Consequently, an external load is fastened to a sling reversibly connected to a release-hook.

The invention thus proposes a method of enabling the jettisoning of the external load from an aircraft to be automated as a function of the position of the sling.

Thus, when the free end of the sling, i.e. the end of the sling to which the external load is fastened, is directed towards the rear of the aircraft, e.g. towards its tail boom, the angle between the sling and said vertical axis in elevation of the aircraft is measured.

If this angle is large, it is assumed that there is a risk for the aircraft, and automatic jettisoning is actuated. The release-hook is then ready to release the sling, and consequently the external load.

Advantageously, the upper bound from which the automatic jettisoning is activated is equal to 60 degrees (°).

The method optionally includes one or more of the following characteristics.

Thus, when the angle between the sling and said vertical axis in elevation of the aircraft lies between a lower bound and the upper bound, a first alarm, which may be visible or audible, is triggered in order to warn the pilot of the aircraft that the sling is approaching a potentially dangerous position.

The lower bound may be of the order of or equal to 45°.

Furthermore, and advantageously, a first value is determined for a quotient of the tension exerted on the sling as divided by an evaluation term that depends on the load factor of said fuselage along and the gravity axis, and a second value is determined for the time derivative of said quotient.

The first and second values then make it possible to determine whether the external load has caught on an external element.

It should be observed that said evaluation term is equal to said load factor of the aircraft fuselage, or else to the product of said load factor multiplied by the acceleration due to gravity (g).

Under such conditions, a second alarm is triggered when firstly automatic jettisoning is not activated as a result of said angle, and secondly said first and second values reach respective predetermined levels.

In contrast, automatic jettisoning is triggered by ordering the release-hook to release the sling when firstly automatic jettisoning is activated as a result of said angle, and secondly said first and second values reach respective predetermined levels.

If the angle between the sling and said vertical axis in elevation of the aircraft exceeds the upper bound, the aircraft is in a potentially dangerous situation, and jettisoning is activated. Furthermore, if the above-described quotient and the derivative of said quotient exceed respective predetermined levels, then it is deduced that the external load has become caught.

The release-hook is then opened automatically in order to jettison the assembly comprising the sling and the external load.

More precisely, automatic jettisoning is triggered by ordering the release-hook to release said sling when firstly automatic jettisoning is activated as a result of said angle, and secondly said first value exceeds an upper limit, independently of the value of said second value.

The first value is then so high, that regardless of the second value, it is deduced that the external load has caught on an external element.

Likewise, automatic jettisoning is triggered by ordering the release-hook to release said sling when firstly automatic jettisoning is activated as a result of said angle, and secondly said first value lies between a lower limit and an upper limit having a positive sign and said second value exceeds a threshold.

In addition to the method, the invention provides an aircraft provided with an attachment device for attaching an external load to a fuselage of the aircraft, said attachment device being provided with a release-hook, with support means, and with a sling, said the release-hook being fastened to an attachment point for attaching to the fuselage by the support means, said sling being secured reversibly to said the release-hook.

This aircraft is remarkable in that it includes measurement means for determining the angle between said sling and a vertical axis in elevation of the aircraft parallel to the yaw axis of the aircraft and passing via an attachment point for attaching said support means for the release-hook to the fuselage of the aircraft, and a processor unit connected to said the release-hook and to said measurement means, said processor unit being suitable for receiving a first signal from the measurement means relating to said angle and to the position of the sling, so as to implement the above-described the automatic jettisoning method as claimed.

For example, the measurement means are provided with a arch, arranged on the support means such as a bar, and with a sensor suitable for being arranged on the fuselage.

The sensor may be an optical sensor determining said angle, and thus determining whether the sling is directed towards the rear of the aircraft, or it may be provided with a movable paddle and with an angle sensor for determining the angular position of the paddle.

When the sling slopes towards the rear of the aircraft, the arch presses against the paddle that therefore performs a pivoting movement. This pivoting movement is detected by the angle sensor which communicates with the processor unit.

The processor unit then deduces from the angle measured by the angle sensor that the sling is sloping towards the rear of the aircraft.

As a function of the information it receives, the processor unit deduces the orientation and the angle of the sling relative to the vertical axis in elevation of the aircraft.

Furthermore, in order to be able to take a decision whether or not to jettison automatically, the attachment device optionally includes a load cell arranged on the support means, the load cell being connected to the processor unit to send thereto a second signal relating to the tension in the sling.

Furthermore, the attachment device includes an accelerometer connected to the processor unit to send thereto a third signal relating to the accelerations to which the fuselage is subjected.

Thus, the processor unit can determine a first value for a quotient of the tension exerted on the sling divided by an evaluation term that depends on the load factor of the fuselage along the gravity axis, and a second value for the time derivative of said quotient. The tension and the load factor along the gravity axis are determined by the processor unit with the help respectively of the load cell and of said accelerometer.

Furthermore, the attachment device optionally includes a display unit controlled by the processor unit to display alarms and/or information relating to the attachment operation.

Finally, in order to increase safety, the connection device includes electrical or mechanical type manual control means for controlling the release-hook.

The present invention also provides the method of fabricating the above-specified device.

BRIEF DESCRIPTION OF THE DRAWINGS

The invention and its advantages appear in greater detail from the context of the following description of embodiments given by way of illustration with reference to the accompanying figures, in which.

Any elements that are present in more than one of the figures are given the same, unchanging references in each of them.

MORE DETAILED DESCRIPTION

Figure 1:
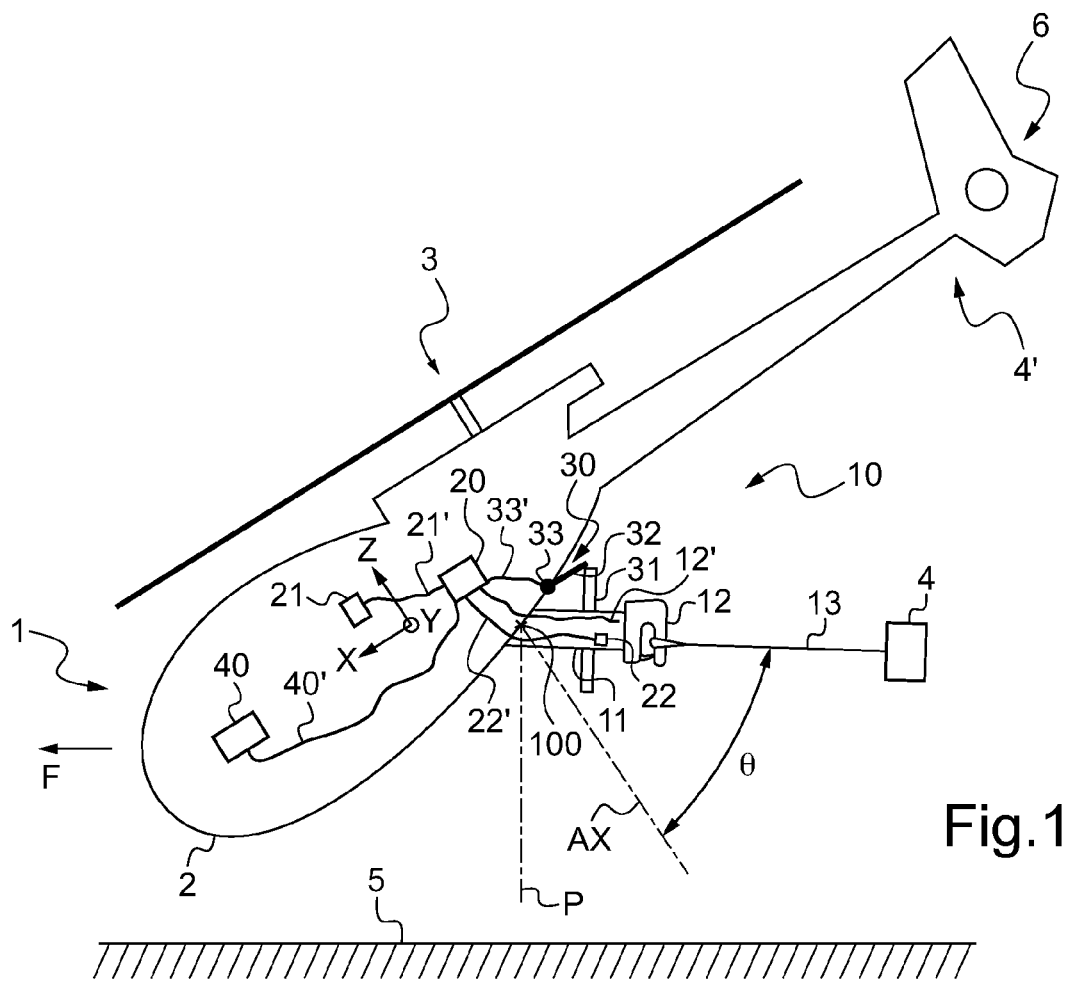
FIG. 1 is a diagrammatic view of a device of the invention.

FIG. 1 is a diagrammatic view of an aircraft flying above ground 5 in the direction of arrow F. This aircraft is a helicopter 1 having a fuselage 2 and a main lift and propulsion rotor 3 together with a tail rotor 6 arranged at the rear of the helicopter 1.

It should be observed that the axes X, Y, and Z represent respectively in the roll axis, the pitch axis, and the yaw axis of the helicopter.

Furthermore, the helicopter 1 is provided with an attachment device 10 in order to support an external load 4.

Thus, the attachment device 10 comprises a release-hook 12 fastened to an attachment point 100 of the fuselage 2 of the helicopter 1 via support means 11, e.g. a bar. Reference can be made to the literature concerning of the conventional operation of a release-hook and its fastener means for fastening the support means to the fuselage 2, e.g. a so-called "swing" frame.

The external load 4 is then attached to the jaw of the release-hook via a sling 13.

In order to be able to release the assembly comprising the sling 13 and the external load 4, the attachment device 10 is provided with manual and automatic means for opening the release-hook 12.

Thus, the attachment device includes a processor unit 20 suitable for automatically causing the release-hook to open by sending instructions thereto, e.g. in the form of an electrical current passing via cabling 12'.

Under such conditions, in order to determine whether the external load 4 needs to be jettisoned, the processor unit is connected to measurement means 30 suitable for determining the orientation of the sling 13 and for determining an angle θ between the sling 13 and the vertical axis in elevation AX of the aircraft parallel to the yaw axis Z of the aircraft and passing via the point of attachment 100 for attaching the support means 11 of the release-hook 12 to the fuselage 2 of the aircraft 1.

These measurement means 30 are fitted with an arch 31 arranged on the support means, e.g. a flexible disk.

Furthermore, these measurement means 30 include a contact sensor that co-operates with the half-ring 31.

More precisely, the contact sensor is provided both with a paddle 32 that is hinged to the fuselage 2 of the helicopter so as to be movable in pivoting, and with an angle sensor 33 for determining the angle of the paddle.

The paddle 32 is arranged between the connection point 100 and the rear end of the aircraft.

Consequently, when the sling 13 moves towards the rear 4' of the helicopter, the arch 31 comes into contact with the paddle and thus causes it to pivot.

Thereafter, the first signal sent by the angle sensor 33 of the measurement means 30 to the processor unit 20 via a cable 33' enables the processor unit to determine the position of the paddle, i.e. its orientation towards the rear of the aircraft, and the angle θ.

For example, the angle sensor delivers an electrical signal of voltage that is proportional to the angle of the paddle and to the angle θ. The angle sensor is of the usual type.

Furthermore, the attachment device 10 includes a first additional means for determining the tension T exerted by the external load 4 on the sling 13.

Conventionally, in the variant shown, these first additional means are constituted by a load cell 22, e.g. implemented as a strain gauge, and arranged on the support means 11.

Like the measurement means, the load cell is connected to the processor unit in such a manner as to send a second signal thereto, said processor unit being capable of determining the tension T in the sling on the basis of this second signal using techniques that are known to the person skilled in the art.

Furthermore, the attachment device 10 includes an accelerometer 21 connected to the processor unit 20 via a cable 21'.

The processor unit thus receives a third signal from the accelerometer in order to determine the load factor $\underline{n}$ of the fuselage 2 along the gravity axis P.

Furthermore, the attachment device is provided with a display unit 40 arranged in the cockpit of the helicopter 1 and connected to the processor unit 20 by cabling 40', which unit is suitable for displaying alarms or other information relating to the attachment operation, such as the number of times the sling has been released, or the total load that has been conveyed during one day, for example.

Finally, the attachment device is provided with manual control means, optionally a control button, suitable for acting directly on the release-hook 12.

An operator can use these control means to open the release-hook 12.

Figure 2:
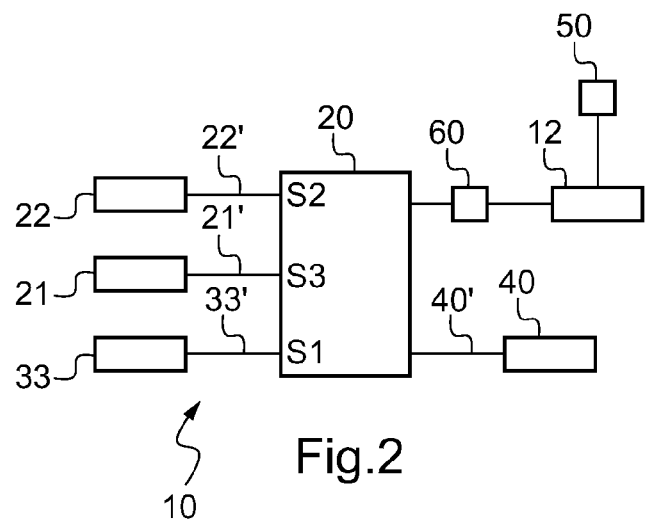
FIG. 2 is a block diagram illustrating the method of the invention.

FIG. 2 shows how the attachment device 12 operates.

The angle sensor 33 of the measurement means 30, the load cell 22, and the accelerometer 21 send respective first, second, and third signals S1, S2, and S3 to the processor unit 20 of the attachment device 10.

In a first period, the processor unit compares the angle θ as determined with the help of the first signal S1 with a lower bound BINF of about 45° and with an upper bound BSUP of 60°.

When said angle is less than the lower bound, the processor unit deactivates automatic jettisoning.

When this angle lies between the lower bound and the upper bound, the processor unit 20 triggers a first alarm, such as a visible alarm that appears on the display unit 40.

At this stage, the risk is still not large. Nevertheless, it is advantageous to warn the pilot of the aircraft in order to indicate whether the sling is coming close to a position that is potentially dangerous.

In contrast, if the angle of the sling reaches the upper bound, and if the sling is directed towards the rear of the aircraft, then the processor unit activates automatic jettisoning.

A first condition necessary for jettisoning is then satisfied, which explains why jettisoning is activated.

During normal forward flight, the sling should not normally depart from the vertical axis in elevation AX of the aircraft 1 by an angle that is greater than the upper bound. Thereafter, the first condition will be satisfied in the event of the aircraft performing an abrupt maneuver, or in the event of the sling becoming blocked.

When in doubt, automatic jettisoning is activated.

In order to decide whether to jettison the assembly comprising the sling and the external load, the processor unit verifies whether a second condition is satisfied.

Thereafter, with the help of the second signal S2 coming from the load cell 22, the processor unit acts in conventional manner to determine the tension T exerted on the sling 13.

Furthermore, with the help of the third signal S3 coming from the accelerometer 21, the processor unit 20 acts in conventional manner to determine the load factor $\underline{n}$ of the fuselage 2 along the gravity axis P.

The processor unit deduces therefrom an evaluation term N that depends on the load factor.

In a first variant, said evaluation term N is equal to the load factor $\underline{n}$, whereas in a second variant, the evaluation term N is equal to the product of the load factor $\underline{n}$ multiplied by the acceleration due to gravity $\underline{g}$, i.e.:

$$N = n * g$$

where: "*" represents the multiplication sign; and
"g" represents the acceleration due to gravity, which is equal to 9.81 meters per second per second (m/s$^2$).

With the help of the voltage T and of the evaluation term N as determined by the processor unit 20, the processor unit 20 acts in real time to calculate the first value V1 of a quotient Q of the tension T exerted on the sling 13 as divided by the evaluation term N that depends on the load factor $\underline{n}$ of said fuselage 2, in application of the following relationship:

$$Q = \frac{T}{N}$$

Likewise, the processor unit 20 operates in real time to calculate a second value V2 for the time derivative $$\frac{dQ}{dt}$$

of the quotient Q.

As a result, the second jettisoning condition is satisfied when the first and second values V1 and V2 reach respective predetermined levels.

It should be observed that monitoring the derivative $$\frac{dQ}{dt}$$

makes it possible to determine whether the increase in the value of the quotient Q is due to the external load catching on an obstacle, or due to turbulence, or even due to the aircraft turning, for example.

Thereafter, the processor unit 20 triggers automatic jettisoning when it observes that both the first and the second conditions are satisfied, i.e. firstly that the sling is directed towards the rear of the aircraft with the angle θ between the sling 13 and a vertical axis in elevation AX of the aircraft exceeding an upper bound, and secondly that the first and second values V1 and V2 have reached respective predetermined levels.

The processor unit then sends an order to the release-hook 12 so that it releases the sling 13.

It should be observed that, should it happen that the second condition is satisfied while jettisoning is not activated, then the processor unit does no more than send a second alarm, e.g. to the display unit 40.

Furthermore, the attachment device may include turn-off means 60 in the form of a control made available to the pilot, in order to deactivate automatic jettisoning. Thus, an automatic jettisoning order coming from the processor unit is then not transmitted to the release-hook 12.

Finally, the attachment device 10 also includes manual control means 50 for controlling the release-hook 12 so as to enable the external load to be delivered to a specific site, which manual control means are in the form of mechanical control means associated with the flying controls of the pilot, or indeed emergency electrical control means that are optionally remotely activatable.

Figure 3:
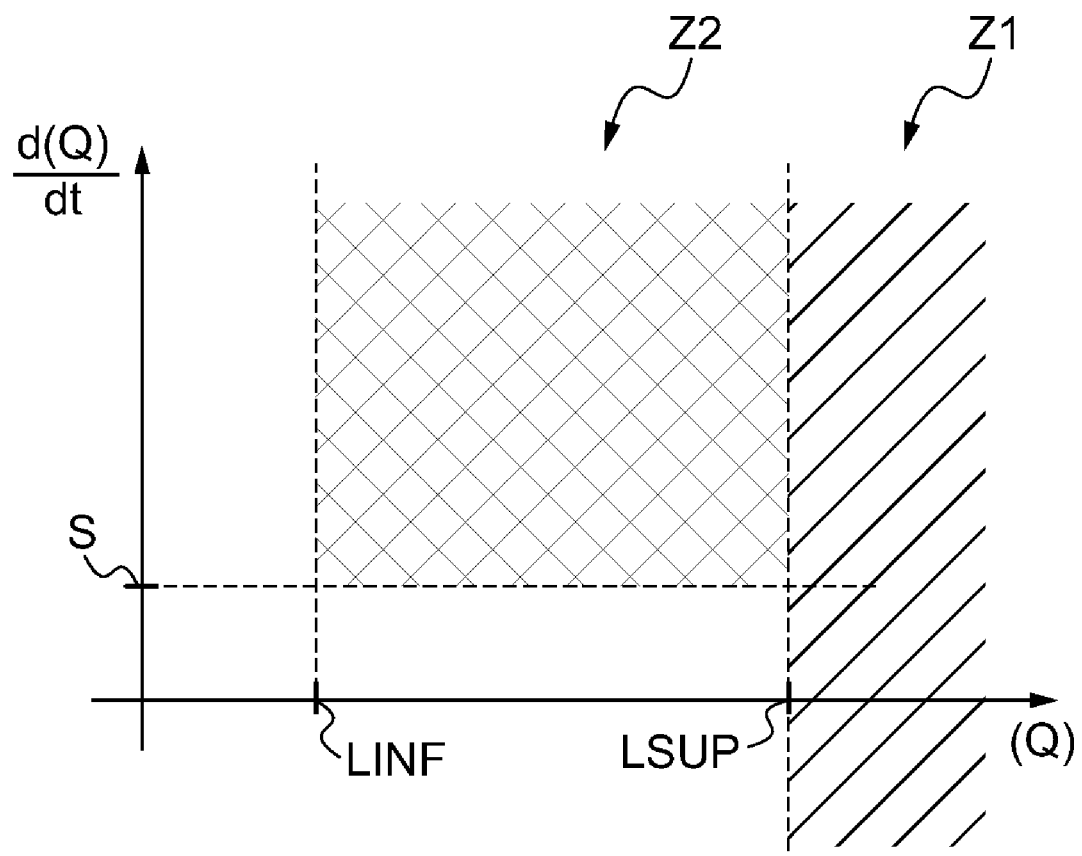
FIG. 3 is a diagram showing the lower and upper limits for the quotient that is determined during the method.

FIG. 3 is a diagram plotting the quotient Q as determined by the processor unit along the abscissa axis, and plotting the time derivative of said quotient Q up the ordinate axis.

This diagram shows shaded zones Z1 and Z2 representing the predetermined levels to be reached by the first and second values so that the processor unit triggers automatic jettisoning of the external load.

Firstly, the predetermined level corresponding to the first shaded zone Z1 is reached when the first value V1 exceeds an upper limit LSUP, regardless of the second value V2.

Assuming that the evaluation term N is equal to the product of the load factor $\underline{n}$ of the fuselage along the gravity axis P multiplied by the acceleration $\underline{g}$ due to gravity, the upper limit may be equal, for example, to 1.2 times the maximum authorized weight for the external load, i.e. 2160 kilograms (kg), for example, for a certain type of helicopter capable of supporting an external load of 1800 kg.

Secondly, the predetermined level corresponding to the second shaded zone Z2 is reached when the first value V1 lies between a lower limit LINF and an upper limit LSUP, while the second value V2 exceeds a positive threshold S.

Assuming that the evaluation term N is equal to the product of the load factor $\underline{n}$ of the fuselage along the gravity axis P multiplied by the acceleration $\underline{g}$ due to gravity, then, by way of example, the lower and upper limits are equal respectively to 0.3 times and to 1.2 times the maximum authorized weight for the external load, giving respectively 540 kg and 2160 kg, by way of example for a certain type of helicopter capable of supporting an external load with a maximum weight of 1800 kg.

Furthermore, the threshold S is advantageously equal to the maximum authorized weight for the external load divided by 0.1 seconds.

Naturally, for a given aircraft, it is possible to determine the values for the threshold and for the lower and upper limits more finely with the help of test flights.

One method consists in carrying out flights with external loads of different weights.

Measurement points $$\left( Q, \frac{dQ}{dt} \right)$$

are then determined with the help of recordings made during test flights, and then these measurement points are plotted on a diagram having the quotient Q plotted along the abscissa axis and having the time derivative of the quotient Q plotted up the ordinate axis.

From this stage, the zones that are not covered by the measurement points are shaded in order to define the shaded zones Z1 and Z2, thereby determining the lower limit, the upper limit, and the threshold. Optionally, it is possible to incorporate safety margins, e.g. of the order of 10%, so as to guarantee that an external load is not jettisoned unduly.

Naturally, the present invention can be subjected to numerous variations as to its implementation. Although several embodiments are described above, it should readily be understood that it is not conceivable to identify exhaustively all possible embodiments. It is naturally possible to envisage replacing any of the means described by equivalent means, without thereby going beyond the ambit of the present invention.

For example, in a variant, the measurement means may implement an optical sensor, or any other type of sensor serving to determine the angle between the sling and a vertical axis in elevation of the aircraft.

What is claimed is:

1. A method of automatically jettisoning an external load (4) suspended reversibly from a release-hook (12) of an aircraft fuselage (2) by means of a sling (13) liable to extend at an angle (θ) of varying magnitude relative to a vertical axis in elevation (AX) of the aircraft (1) parallel to the yaw axis (Z) of the aircraft (1) and passing via a connection point (100) connecting support means (11) for the release-hook (12) to the fuselage (2) of the aircraft (1), the method comprising:
    measuring said angle (θ); and
    activating automatic jettisoning when firstly said angle (θ) exceeds an upper bound (BSUP), and secondly said sling (13) is directed towards the rear (4') of the aircraft thereby making it possible, optionally, to proceed with jettisoning said external load (4).

2. A method according to claim 1, wherein, when said angle (θ) lies between a lower bound (BINF) and said upper bound (BSUP), a first alarm is triggered.

3. A method according to claim 1, wherein a first value (V1) is determined for a quotient (Q) of a tension (T) exerted on the sling (13) as divided by an evaluation term (N) that depends on a load factor (n) of said fuselage (2) along and a gravity axis (P), and a second value (V2) is determined for the time derivative $$\left(\frac{dQ}{dt}\right)$$

of said quotient (Q).

4. A method according to claim 3, wherein said evaluation term (N) is equal to said load factor (n).

5. A method according to claim 3, wherein said evaluation term (N) is equal to the product of said load factor (n) multiplied by an acceleration due to gravity (g).

6. A method according to claim 3, wherein a second alarm is triggered when firstly automatic jettisoning is not activated as a result of said angle (θ), and when secondly said first and second values (V1, V2) reach respective predetermined levels.

7. A method according to claim 3, wherein automatic jettisoning is triggered by ordering said release-hook (12) to release said sling (13) when firstly automatic jettisoning is activated as a result of said angle (θ), and when secondly said first and second values (V1, V2) reach respective predetermined levels.

8. A method according to claim 3, wherein automatic jettisoning is triggered by ordering the release-hook (12) to release said sling (13) when firstly automatic jettisoning is activated as a result of said angle (θ), and when secondly said first value (V1) exceeds an upper limit (LSUP), independently of the value of said second value (V2).

9. A method according to claim 3, wherein automatic jettisoning is triggered by ordering the release-hook (12) to release said sling (13) when firstly automatic jettisoning is activated as a result of said angle (θ), and secondly said first value (V1) lies between a lower limit (LINF) and an upper limit (LSUP) and said second value (V2) exceeds a threshold (S).

10. An aircraft (1) provided with an attachment device (10) for attaching an external load (4) to a fuselage (2) of the aircraft (1), said attachment device (10) being provided with a release-hook (12), with support means (11), and with a sling (13), said the release-hook (12) being fastened to an attachment point (100) for attaching to the fuselage (2) by the support means (11), said sling (13) being secured reversibly to said the release-hook (12) and being liable to extend at an angle (θ) relative to a vertical axis in elevation (AX) of the aircraft parallel to a yaw axis (Z) of the aircraft (1) and passing via an attachment point (100) for attaching said support means (11) for the release-hook (12) to the fuselage (2) of the aircraft, wherein the aircraft includes measurement means (30) for determining said angle (θ), and a processor unit (20) connected to said release-hook (12) and to said measurement means (30), said processor unit (20) being suitable for receiving a first signal (S1) from the measurement means (30) relating to said angle and to the position of the sling, so as to implement the automatic jettisoning method according to claim 1.

11. An aircraft according to claim 10, wherein said measurement means (30) are provided with an arch (31) arranged on said support means (11) and with a sensor (32, 33) suitable for being arranged on said fuselage (2).

12. An aircraft according to claim 11, wherein said sensor is provided with a movable paddle (32) and with an angle sensor (23) for determining the position of said paddle (32).

13. An aircraft according to claim 10, wherein said attachment device comprises a load cell (22) arranged on said support means (11), said load cell (22) being connected to said processor unit (20) to send thereto a second signal (S2) relating to the tension (T) of said sling (13).

14. An aircraft according to claim 10, wherein said attachment device (10) includes an accelerometer (21) connected to said processor unit (20) to send thereto a first signal (S3) relating to the accelerations to which said fuselage (2) is subjected so as to enable the processor unit (20) to determine a first value of (V1) for a quotient (Q) of the tension (T) exerted on the sling (13) as divided by an evaluation term the depends on the load factor (n) of said fuselage (2) along the gravity axis (P), and a second value (V2) for the time derivative $$\left(\frac{dQ}{dt}\right)$$

of said quotient (Q).

15. An aircraft according to claim 10, wherein said attachment device (10) includes a display unit (40) controlled by the processor unit (20) to display alarms and/or information relating to the attachment operation.

16. An aircraft according to claim 10, wherein said attachment device (10) includes manual control means (50) for controlling the release-hook (12).

* * * * *